(12) United States Patent
Benson et al.

(10) Patent No.: US 7,359,339 B2
(45) Date of Patent: Apr. 15, 2008

(54) SMART ACCESS POINT

(75) Inventors: Paul Harrison Benson, Raleigh, NC (US); Cory Allen Chapman, Raleigh, NC (US); James Stephen Rutledge, Durham, NC (US); Ken Scott Seethaler, Raleigh, NC (US)

(73) Assignee: Lenovo Singapore Pte Ltd, Singapore (SG)

( * ) Notice: Subject to any disclaimer, the term of this patent is extended or adjusted under 35 U.S.C. 154(b) by 846 days.

(21) Appl. No.: 10/744,031

(22) Filed: Dec. 23, 2003

(65) Prior Publication Data

US 2005/0135236 A1    Jun. 23, 2005

(51) Int. Cl.
H04L 12/28    (2006.01)
(52) U.S. Cl. .................. 370/254; 370/244; 370/329
(58) Field of Classification Search ............. 370/225, 370/329, 332, 328, 241, 242, 244, 250, 254; 709/221, 224, 250, 225
See application file for complete search history.

(56) References Cited

U.S. PATENT DOCUMENTS

| | | | |
|---|---|---|---|
| 5,654,959 A | 8/1997 | Baker et al. ................. 370/331 |
| 5,768,531 A | 6/1998 | Lin ........................ 395/200.72 |
| 5,907,542 A | 5/1999 | Kuehnel et al. ............. 370/331 |
| 6,032,266 A * | 2/2000 | Ichinohe et al. ............... 714/9 |
| 6,188,681 B1 | 2/2001 | Vesuna ........................ 370/338 |
| 6,651,105 B1 | 11/2003 | Bhagwat et al. ............. 709/239 |
| 6,868,509 B2 * | 3/2005 | Gale et al. ..................... 714/43 |
| 6,877,104 B1 * | 4/2005 | Shimono ....................... 714/4 |
| 7,319,664 B2 * | 1/2008 | Chen et al. ................... 370/217 |
| 2002/0027894 A1 | 3/2002 | Arrakoski et al. ........... 370/338 |
| 2002/0061009 A1 | 5/2002 | Sorensen ..................... 370/351 |
| 2002/0131371 A1 * | 9/2002 | Rudnick ...................... 370/252 |
| 2002/0141385 A1 | 10/2002 | Wasik et al. ................. 370/352 |
| 2002/0173275 A1 * | 11/2002 | Coutant ...................... 455/67.1 |
| 2003/0037169 A1 | 2/2003 | Kitchin ........................ 709/249 |
| 2003/0065784 A1 | 4/2003 | Herrod ........................ 709/227 |
| 2003/0087629 A1 * | 5/2003 | Juitt et al. ................... 455/411 |

(Continued)

FOREIGN PATENT DOCUMENTS

JP    2000-349787    12/2000

(Continued)

*Primary Examiner*—Kwang Bin Yao
*Assistant Examiner*—Kenan Cehic
(74) *Attorney, Agent, or Firm*—Synnestvedt & Lechner LLP; Carlos Munoz-Bustamante

(57) ABSTRACT

The present invention provides a "smart" AP, whereby the AP periodically checks its connection with a network and, if a determination is made that the connection between the AP and the network server has been lost, an indication of this loss of connection is made available to all wireless stations connected to the AP. In a preferred embodiment, the indication given to the wireless stations is in the form of an SSID change. When the AP detects the loss of network connection, it automatically changes its SSID from a primary SSID to an alternative SSID. The wireless stations receive the alternative SSID and, since they are configured to connect to the primary SSID, immediately and automatically begin to search for another AP in the system that is using the primary SSID, and then connect to AP having the strongest signal. In one embodiment, the alternative SSID's can be selected so as to provide diagnostic assistance to a person attempting repairs to the faulty AP/network connection.

14 Claims, 4 Drawing Sheets

U.S. PATENT DOCUMENTS

| | | | |
|---|---|---|---|
| 2003/0091015 A1 | 5/2003 | Gassho et al. | 370/338 |
| 2003/0232598 A1* | 12/2003 | Aljadeff et al. | 455/41.2 |
| 2004/0066756 A1* | 4/2004 | Ahmavaara et al. | 370/328 |
| 2004/0114601 A1* | 6/2004 | Watanabe et al. | 370/395.2 |
| 2004/0203558 A1* | 10/2004 | Suzuki et al. | 455/403 |
| 2004/0268175 A1* | 12/2004 | Koch et al. | 714/4 |
| 2005/0111472 A1* | 5/2005 | Krischer et al. | 370/412 |
| 2005/0135422 A1* | 6/2005 | Yeh | 370/474 |
| 2005/0182969 A1* | 8/2005 | Ginter et al. | 713/201 |
| 2005/0232209 A1* | 10/2005 | Buckley et al. | 370/338 |
| 2005/0254474 A1* | 11/2005 | Iyer et al. | 370/338 |
| 2006/0069760 A1* | 3/2006 | Yeap et al. | 709/221 |

FOREIGN PATENT DOCUMENTS

| | | |
|---|---|---|
| JP | 2002-077071 | 3/2002 |
| JP | 2003-258817 | 9/2003 |

* cited by examiner

SMART ACCESS POINT

BACKGROUND OF THE INVENTION

1. Field of the Invention

This invention pertains to wireless networks generally and, more particularly, to means for maintaining connections between wireless stations and wired networks.

2. Description of the Related Art

Local area networks (LANs) have been used for years and typically consist of nodes interconnected by physical telecommunications media (e.g., coaxial cable, twisted pair wire, or fiber optics). More recently, wireless LANs have become more popular and are now commonly found in both business and home environments.

Rather than having physical telecommunications media connecting devices to the network, wireless LANs use one or more access points (AP's) to transmit data from the network to wireless stations (e.g., wireless-enabled laptops, PDAs and the like) within the AP's basic service area. If a wireless station is located within the basic service area of a particular AP, that wireless station will be able to receive transmissions sent by that AP. An AP (or system using multiple AP's, such as a system comprising multiple AP's at a particular office location or campus) uses a Service Set IDentifier (SSID) to differentiate itself from other AP's that are not part of the system. A user wishing to connect a wireless station to an AP in the system must provide the unique SSID; the wireless station will search for AP's matching the SSID, and then connect to the one having the strongest signal. Once the connection is made, the wireless station is connected to the network.

A problem exists, however, when the AP to which the wireless station is connected loses its network connection. This can happen for a variety of reasons, such as a defect/failure in connectors, cabling, upstream routers or switches, and the like. The connection between the wireless stations and the AP, and the AP and the network, are two independent connections; thus, when the connection between the network and an AP is lost, the connection between the wireless stations and that AP remains. The AP stays connected to each of the users in its area because it has the strongest signal local to the client; all of the AP's in the system use the same SSID and thus the wireless station simply connects (stays connected) to the strongest one. This keeps the client from searching for another access point which may be connected to the network, and thus the wireless stations remain disconnected from the network.

Accordingly, it would be desirable to have a method and system for alerting wireless stations of a disconnection of an AP from the network, so that alternate APs could be searched for and accessed.

SUMMARY OF THE INVENTION

The present invention provides a "smart" AP, whereby the AP periodically checks its connection with the network and, if a determination is made that the connection between the AP and the network server has been lost, an indication of this loss of connection is made available to all wireless stations connected to the AP. In a preferred embodiment, the indication given to the wireless stations is in the form of an SSID change. When the AP detects the loss of network connection, it automatically changes its SSID from a primary SSID to an alternative SSID. The wireless stations receive the alternative SSID and, since they are configured to connect to the primary SSID, immediately and automatically begin to search for another AP in the system that is using the primary SSID, and then connect to AP having the strongest signal. In one embodiment, the alternative SSID's can be selected so as to provide diagnostic assistance to a person attempting repairs to the faulty AP/network connection.

DETAILED DESCRIPTION OF THE PREFERRED EMBODIMENTS

Figure 1:
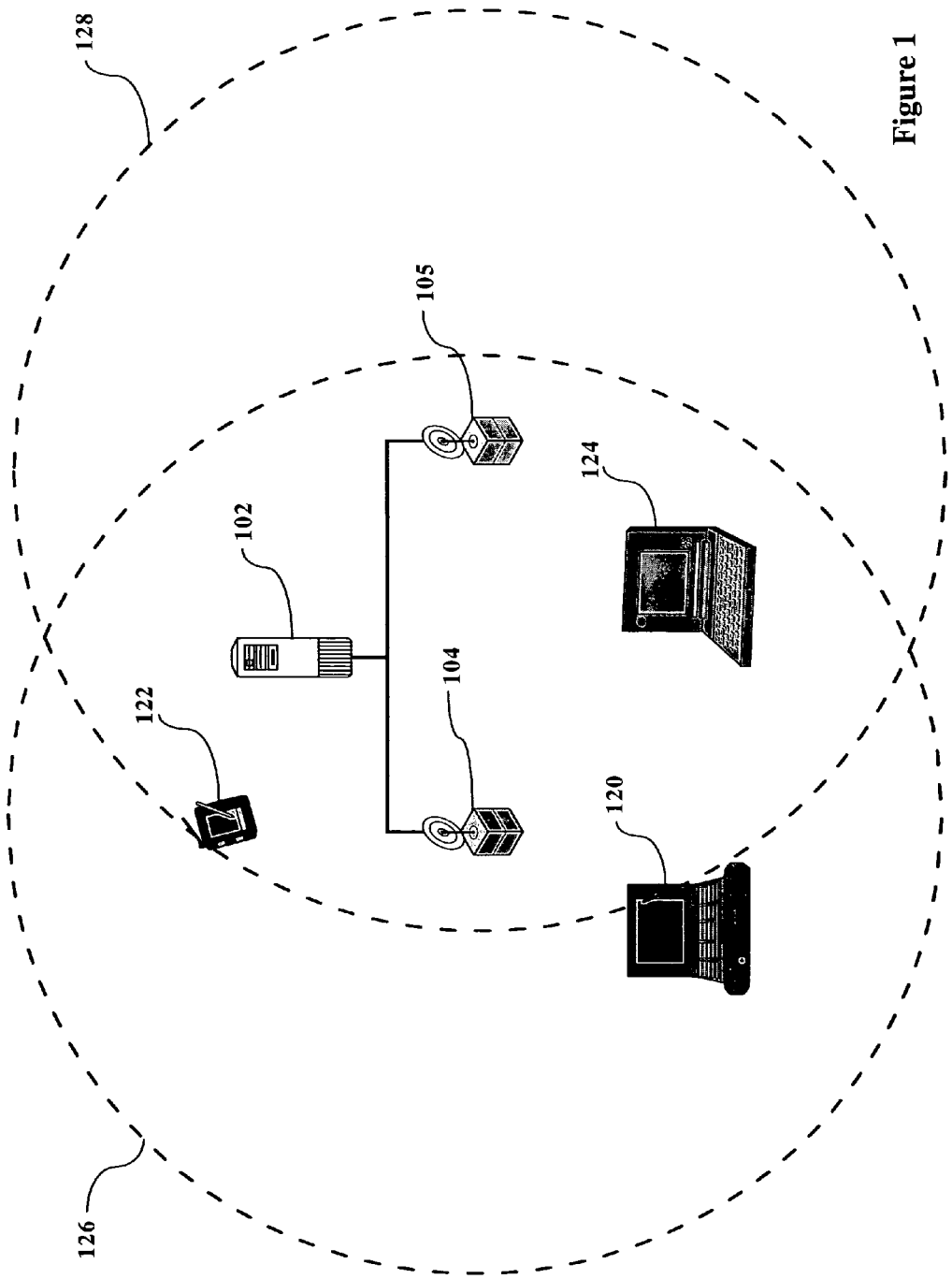
FIG. 1 illustrates a wireless network comprising a network server hardwired to multiple access points.

FIG. 1 illustrates a wireless network comprising a network server 102 hardwired to access points 104 and 105. It is understood that while two access points are illustrated in FIG. 1, a single access point or many more than two access points could be provided and still be within the scope of the present invention.

Wireless stations 120, 122, and 124 are each connected wirelessly to network server 102 via AP 104. This connection is made using standard wireless techniques and the details of the connection are not further discussed herein.

The basic service area of AP 104 is illustrated by circle 126, and the basic service area of AP 105 is illustrated by circle 128. As can be seen, there is an area of overlap, where the service area of AP 104 and AP 105 coincide. In this example, each of the wireless stations 120, 122, and 124 are situated in the coinciding basic service areas of AP 104 and 105. Wireless station 120 and wireless station 122 are clearly closer to AP 104 in FIG. 1 and thus, in a typical configuration, would connect with AP 104 before connecting with AP 105, since the service is probably stronger. Wireless station 124 appears situated approximately equidistant between AP 104 and AP 105 and thus could potentially be connected to either; in this example, however, it is considered to be currently connected to AP 104.

Figure 2:
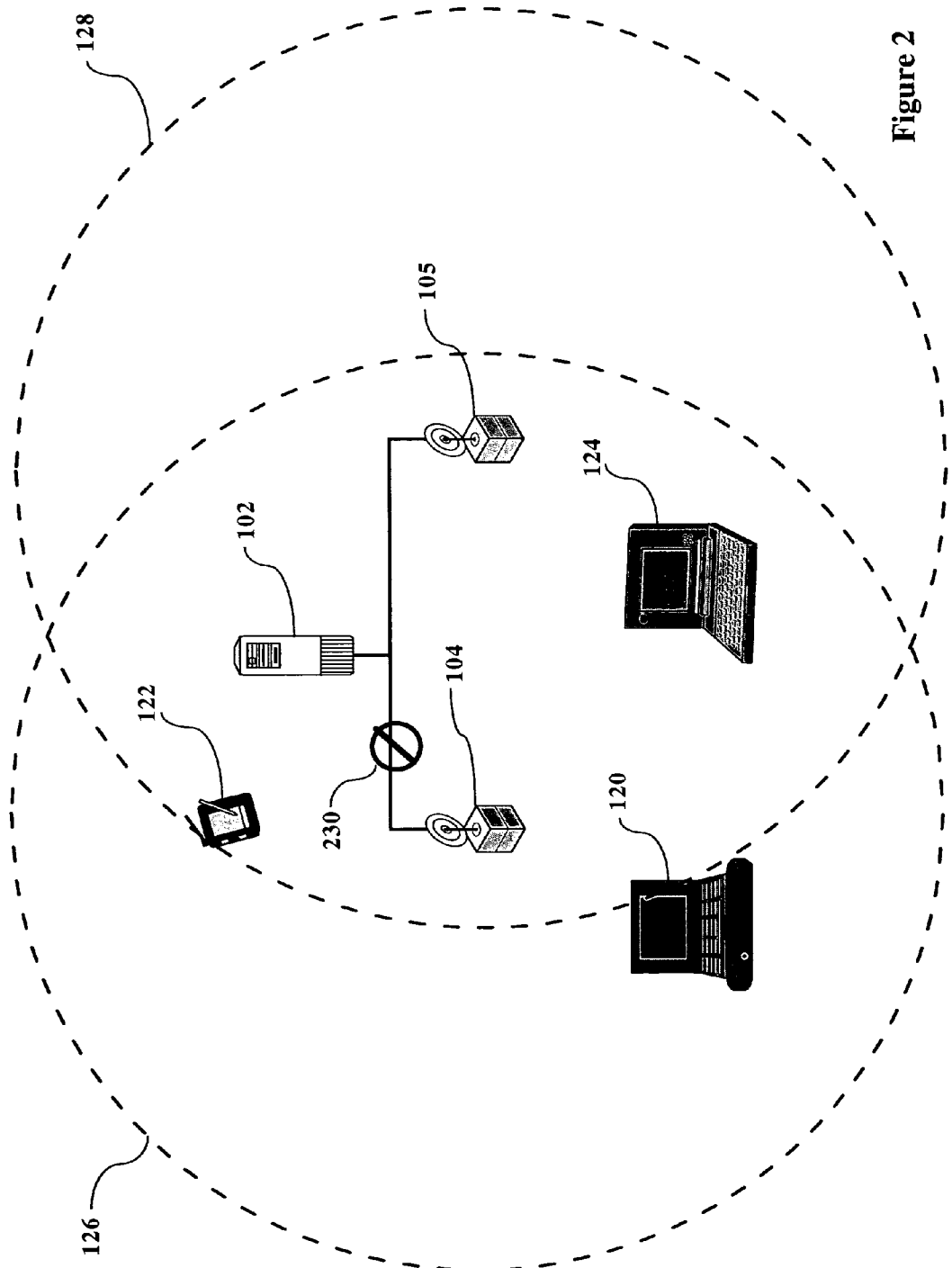
FIG. 2 illustrates the network connection of FIG. 1, with a break in the network connection.

FIG. 2 illustrates a break 230 in the network connection between network server 102 and AP 104. In this situation, under prior art configurations, the communication between wireless stations 120, 122 and 124 with AP 104 would continue. The connections between the wireless stations and the AP is independent of the connection between the AP and the network, and thus there is no triggering action that causes the wireless stations to attempt to reconnect or connect with another AP. The wireless station maintains its connection with the strongest AP using the system-wide SSID, and in the example of FIG. 2, this would be AP 104.

At some point, a user of one of the wireless stations might find that an attempt to obtain data from network server 102 will not work; however, they will continue to be connected to AP 104 and thus will not have the ability to obtain the desired data unless the AP with the faulty connection is returned to proper function. If the user becomes aware or suspects that there is a problem with the network connection to the AP, the user may be able to manually define the AP connection so that their wireless station is restricted to connection to a particular AP in the system (e.g., by restricting the connection to a specific MAC address); however, this "solution" may not be available to all wireless stations, requires the user to know how to perform this function and know which other AP they should connect to, and only serves to correct the problem on an individual station-by-station basis.

Figure 3:
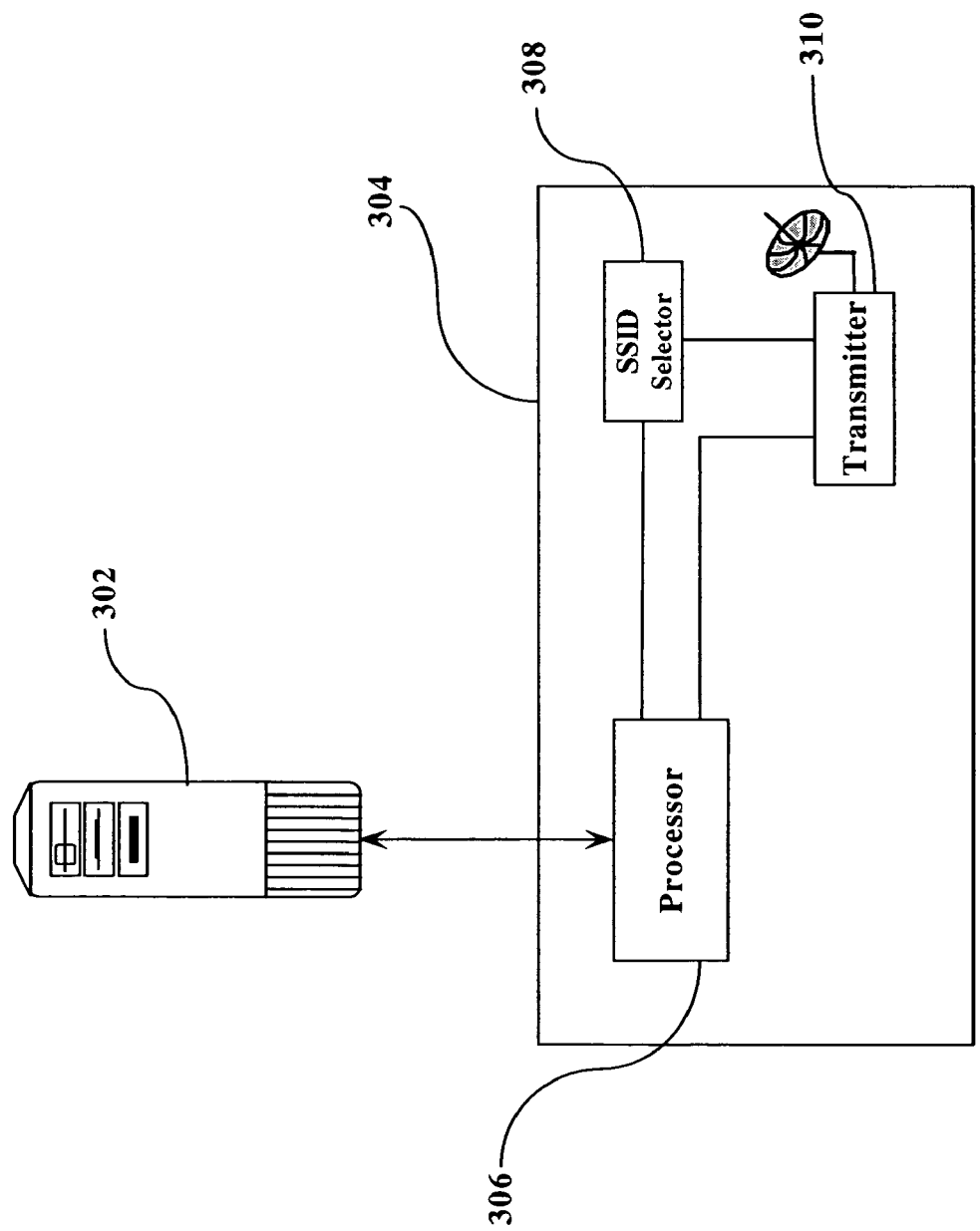
FIG. 3 is a block diagram illustrating an exemplary AP in accordance with the present invention.

In accordance with the present invention, however, the AP 104 (as well as AP 105 or any other APs connected to network server 102) periodically (once every ten seconds, once every minute, etc.) "ping" network server 102 to check the connection. FIG. 3 illustrates a block diagram of an exemplary AP 304 which can be configured to perform the method of the present. Referring to FIG. 3, processor 306 of AP 304 is configured to perform the periodic ping function. Configuring a processor to perform a periodic ping function is well-known in the art and thus, the details of this configuration process are not discussed further herein. If, upon pinging network 302, a return is received, indicating the connection is still in place, AP 304 continues to return the primary SSID to AP's connecting, or connected, thereto.

If, however, the result of the ping is an indication that the network connection has been lost, SSID selector 308 is configured to change the primary SSID to an alternative SSID and transmit that to the wireless stations via transmitter 310. Since the wireless stations are configured to communicate with AP's having the primary SSID, AP 304 is "seen" by the wireless stations as being one that is not associated with the system to which the wireless stations wish to communicate. Thus, the wireless stations will automatically and immediately search for the strongest AP in the system (relative to each wireless station) that is using the primary SSID, and connect thereto. If, at some point, AP 304 reestablishes its network connection, the ping process will confirm the reestablished connection, and the SSID selector 308 will switch back to the primary SSID and transmitter 310 will transmit the primary SSID again. Any wireless devices for which AP 304 is the strongest AP will reconnect to AP 304 when this occurs.

Figure 4:
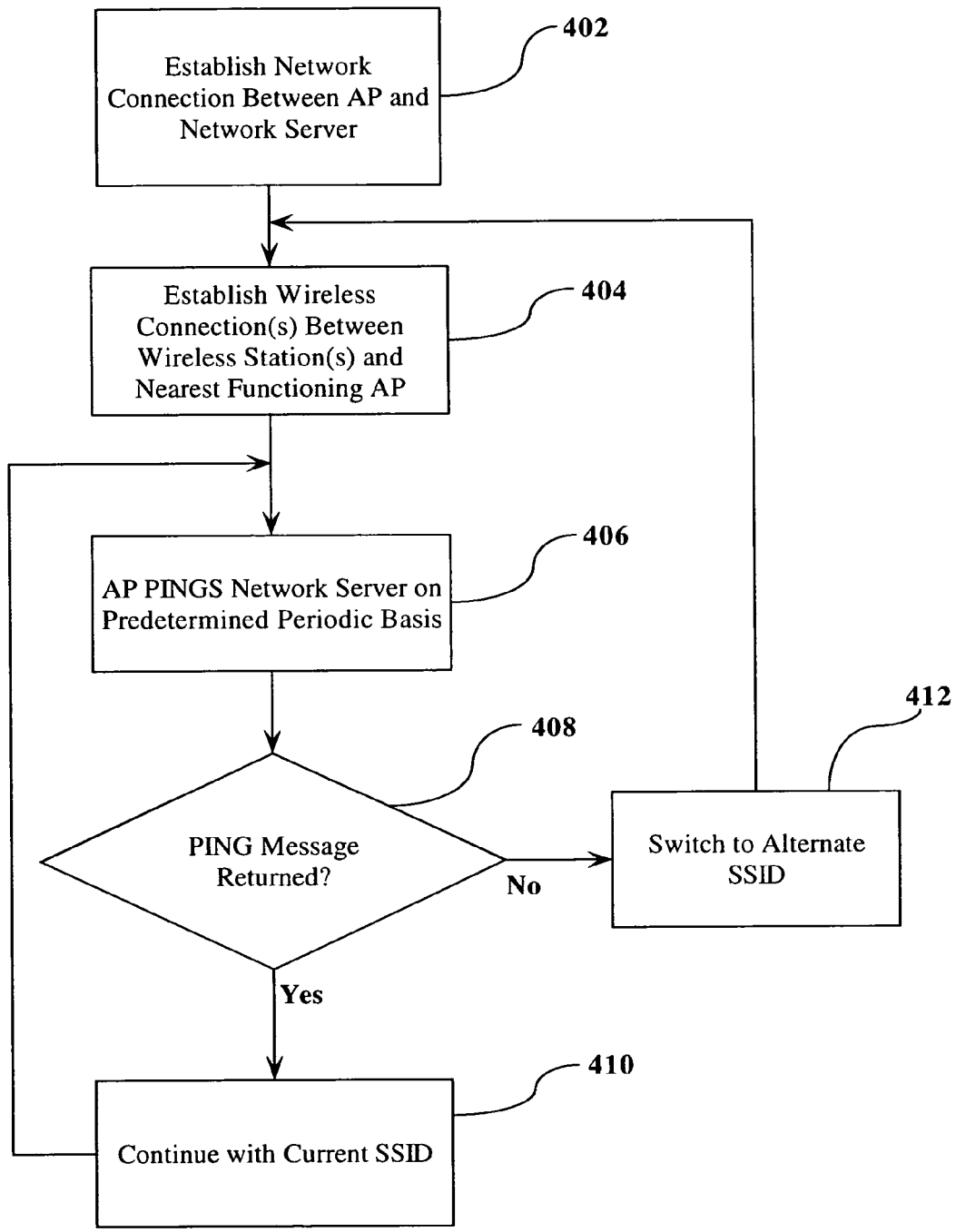
FIG. 4 is a flowchart illustrating an example of basic steps performed in accordance with the present invention.

FIG. 4 is a flowchart illustrating an example of the basic steps performed in accordance with the present invention. At step 402 a network connection is established between an AP and a network server. This connection provides connectivity between wireless stations and the network server, as long as they are connected to the AP and the AP has an established connection with the network.

At step 404, wireless connections are established between wireless stations and the nearest functioning AP. To establish this connection, the wireless stations must present to the AP the SSID being used by the AP. For example, a user using a wireless station will typically input a desired SSID into the configuration utility of their wireless card/driver when setting up the wireless station for wireless connectivity. Then, when using the wireless station in a wireless environment, the wireless station will "look" for AP's using the same SSID, in a well-known manner.

At step 406, in accordance with the present invention, the AP, being configured to ping the network, sends out a ping message to the network server on a periodic basis. This periodic basis can be as long or as short as desired by the system administrator, e.g., once a second, once a minute, once every ten minutes, etc.

At step 408, a determination is made as to whether or not a ping message was returned. As is well known, when a ping message is sent out from a device to another device, the device being pinged returns a message and, based on this message, the speed of the connection can be established. If there is no proper connection established, no ping message is received from the target device (or a message is received indicating a poor-quality connection, a very slow connection, etc.). Thus, if there is a proper network connection between the AP and the network server, a ping message will be returned, and the process will proceed to step 410, where the currently-used SSID continues to be maintained as the SSID of the AP. The process then proceeds back to step 406 to wait for the next ping message.

If, however, at step 408, no ping message is returned, or a message indicating the existence of a poor-quality connection, the process proceeds to step 412. No return ping message indicates no connection; in accordance with the present invention, however, a threshold can also be established regarding the quality of a connection. Thus, a return message indicating a slow connection below a threshold speed, or a connection having a certain level of noise, could be considered an "improper" connection, and treated the same as though there were no connection.

In accordance with the present invention, at step 412, the AP switches to an alternate SSID when there is not a proper connection between the AP and the network. The AP is configured to have one or more alternate SSIDs available for this purpose. Thus, upon there being no ping message returned from the server, the AP switches to the alternate SSID, thus forcing the wireless stations to look elsewhere for an AP using the primary SSID. The AP with the faulty network connection is now essentially dormant, waiting to be repaired. An IT specialist, being unable to reach the AP via the network to probe it for problems, can go to the physical location of the AP and use a wireless station to scan for all SSID's being transmitted. The alternate SSID will be "found" by the IT specialist; if desired, the SSID selector can be configured to select from a list of alternative SSID's, with the specific SSID selected being dependent upon the type of problem being encountered by the AP. This will allow the alternative SSID to serve as a "diagnostic code" of sorts to the IT specialist.

The process then proceeds back to step 404, where wireless connections are established again between wireless stations and the nearest functioning AP. If the original AP has already recovered from whatever network problem it was experiencing, this may mean that the wireless stations reconnect to the same AP. However, if the network connection between the original AP and the network server continues to be faulty, the wireless stations will connect (or at least attempt to connect) to another functioning AP in the area.

By configuring the AP to repeatedly ping the network server and switch to an alternate SSID when no ping message is returned, the wireless stations are essentially alerted when a problem occurs and automatically switch to an alternate AP if necessary. This is a vast improvement over the prior art, where, in the same situation, the wireless stations would maintain the connection to the AP having the faulty network connection until manual action is taken by the user.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage on a network server, AP, or wireless station. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. For example, in the above examples, when the AP determines that there is a problem with its connection to the network, the AP changes to an alternative SSID, thereby causing the wireless stations to search for an AP that uses the primary SSID. However, it is understood that, instead of changing SSID's, the AP could simply be shut down altogether, or could remain powered up but prevented from transmitting, while the problem persists; either of these scenarios would cause the wireless stations to search for a transmitting AP that uses the primary SSID.

Further, while the above examples are directed to determining if a proper connection exists between the AP and the server, it is also contemplated that a determination can be made as to whether or not the AP is functioning to properly transmit signals to the wireless stations, and if it is not, taking the actions described above for causing the wireless stations to search for a new AP with which to communicate. Configuring the system to operate in this manner is within the skills of a practitioner of ordinary skill in the art. It is intended by the appended claims, to cover all modifications of the invention which fall within the true spirit and scope of the invention.

We claim:

1. A method comprising:
   establishing a connection between a server and a wireless Access Point (AP);
   querying said server at predetermined intervals to determine if a proper connection exists between said server and said AP; and
   reconfiguring connectability options of said AP upon a determination that an improper connection exists between said server and said AP wherein said reconfiguring comprises switching a primary Service Set Identifier (SSID) to an alternate SSID selected to provide diagnostic information regarding reasons for said improper connection.

2. The method of claim 1, wherein said querying step comprises sending a ping message from said AP to said server.

3. The method of claim 1, wherein said reconfiguration step comprises shutting down said AP.

4. The method of claim 1, wherein said reconfiguration step comprises terminating wireless transmissions from said AP.

5. A system comprising:
   means for establishing a connection between a server and a wireless Access Point (AP);
   means for querying said server at predetermined intervals to determine if a proper connection exists between said server and said AP; and
   means for reconfiguring connectability options of said AP upon a determination that an improper connection exists between said server and said AP wherein said reconfiguring comprises switching a primary Service Set Identifier (SSID) to an alternate SSID selected to provide diagnostic information regarding reasons for said improper connection.

6. The system of claim 5, wherein said querying means comprises means for sending a ping message from said AP to said server.

7. The system of claim 5, wherein said reconfiguration means comprises means for shutting down said AP.

8. The system of claim 5, wherein said reconfiguration means comprises means for terminating wireless transmissions from said AP.

9. A computer program product comprising a computer readable storage medium having computer readable code embodied in the medium, the computer readable program code comprising instructions effective when executing to:
   establish a connection between a server and a wireless Access Point (AP);
   query said server at predetermined intervals to determine if a proper connection exists between said server and said AP; and
   reconfigure connectability options of said AP upon a determination that an improper connection exists between said server and said AP wherein said reconfiguring comprises switching a primary Service Set Identifier (SSID) to an alternate SSID selected to provide diagnostic information regarding reasons for said improper connection.

10. The computer program product of claim 9, wherein said computer readable program code for querying comprises instructions effective when executing to:
    send a ping message from said AP to said server.

11. The computer program product of claim 9, wherein said computer readable program code for reconfiguring comprises instructions effective when executing to shut down said AP.

12. The computer program product of claim 9, wherein said computer readable program code for reconfiguring comprises instructions effective when executing to terminate wireless transmissions from said AP.

13. A method comprising:
    establishing a connection between a server and a first wireless Access Point (AP);
    establishing a wireless connection between said first AP and one or more wireless stations;
    querying said server at predetermined intervals to determine if a proper connection exists between said server and said first AP;
    changing an Service Set Identifier (SSID) of said first AP from a primary SSID to an alternative SSID upon a determination that an improper connection exists between said server and said AP; and establishing a wireless connection between said one or more wireless stations and a different AP when said first AP changes to said alternative SSID.

14. A method comprising:

establishing a connection between a server and a wireless Access Point (AP);

determining if said AP is functioning to properly transmit signals from said server to wireless stations; and reconfiguring connectability options of said AP upon a determination that said AP is not functioning to properly transmit signals from said server to wireless stations wherein said reconfiguring comprises switching a primary Service Set Identifier (SSID) to an alternate SSID selected to provide diagnostic information regarding reasons for said improper connection.

\* \* \* \* \*